United States Patent [19]

Saviotti

[11] Patent Number: 5,612,998
[45] Date of Patent: Mar. 18, 1997

[54] INTEGRATED INTERFACE CIRCUIT FOR DRIVING A SUBSCRIBER LINE

[75] Inventor: Vanni Saviotti, Monza, Italy

[73] Assignee: SGS-Thomson Microelectronics, S.r.l., Agrate Brianza, Italy

[21] Appl. No.: 281,738

[22] Filed: Jul. 27, 1994

[30] Foreign Application Priority Data

Jul. 29, 1993 [IT] Italy .................. 93830338.5

[51] Int. Cl.$^6$ .................................................. H04M 19/00
[52] U.S. Cl. ...................... 379/399; 379/413; 379/398
[58] Field of Search ................... 379/399, 413, 379/387, 398, 405

[56] References Cited

U.S. PATENT DOCUMENTS

| | | | |
|---|---|---|---|
| 4,614,840 | 9/1986 | Bienstman et al. | 379/413 |
| 4,800,589 | 1/1989 | Siligoni et al. | 379/413 |

FOREIGN PATENT DOCUMENTS

| | | | |
|---|---|---|---|
| 0193244A2 | 9/1986 | European Pat. Off. | H04Q 1/38 |
| 2102249 | 1/1983 | United Kingdom | H04M 3/06 |

OTHER PUBLICATIONS

Davis, P.C. and Crigler, F.W. "A Hybrid Integrated Trunk and Subscriber Line Interface," *IEEE International Solid-State Circuits Conference* (1982): 204–105.

Danneels, J.M. Van Den Bossche, L., Bienstman, L.A. "Monolithic 70 V Bipolar Linedriver IC for PCM SLI," *IEEE Journal of Solid-State Circuits* SC-18(3): 316–324, 1983.

*Primary Examiner*—Thomas W. Brown
*Assistant Examiner*—Jacques M. Saint-Surin
*Attorney, Agent, or Firm*—David V. Carlson; Seed and Berry LLP

[57] ABSTRACT

An integrated telephone interface circuit for driving a telephone line includes a line current sensor and a phase converter, both associated with an output stage connected to the telephone line. The circuit is equipped with a protection device against the generation of spurious signals including a comparator connected between the converter and the output stage, a control and monitoring circuit linked operatively to an output of the comparator, and a plurality of switches associated with the input side of the converter, as well as with the current sensor and the output stage. The switches are linked operatively to respective outputs of the control and monitoring circuit to reverse polarity of the line supply upon a predetermined threshold value for the comparator being exceeded.

9 Claims, 2 Drawing Sheets

5,612,998

INTEGRATED INTERFACE CIRCUIT FOR DRIVING A SUBSCRIBER LINE

FIELD OF THE INVENTION

The invention is related in particular to the field of telephone circuitry which interfaces lines connected to telephone subscriber apparatuses with a central station. More particularly, this invention relates to an interface integrated circuit for driving telephone subscriber lines, being of a type which comprises a line current sensor and a phase converter, both associated with an output stage connected to the telephone line.

BACKGROUND OF THE INVENTION

There exists a demand in this specific field to improve the quality of the communications over the telephone lines and, at the same time, to expand the range of services offered to the users. In this respect, it can be mentioned that token-operated apparatuses installed in public telephone boxes produce noise (spurious signals) in the audio band each time that a token is accepted. This is due to a reversal of the polarity brought about at the line ends. Furthermore, in recent years, complex telephone services, such as "videotel", are gaining widespread acceptance. Such services involve transmission of trains of digital information over the telephone lines.

To fill such increasingly more sophisticated demands, a constant effort to improve the quality of transmission over telephone lines has become mandatory. This effort concentrates, on the one side, on improving the structural quality of each line or of the telephone network as a whole. In fact, many national telephone companies are known to be involved in restoring their telephone networks through the use of fiber optics. On the other side, the improvement effort is directed toward the suppression of any noise in the audio band as well as interference in the band employed for transmitting digital information. To that aim, attention has been focused on the circuit devices which operate to interface the telephone subscriber lines. For example, it is a well-recognized fact that a controlled or "soft" reversal in the supply polarity to the telephone subscriber line could ensure suppression of the aforesaid noise caused by public telephones.

As used herein, "polarity reversal" or "battery reversal" means to exchange the polarities of the TIP and RING wires in a two-wire telephone line. In other words, to reverse polarity is to cause the TIP wire to take the voltage of the RING wire, and vice versa. It would indeed be appreciated if the interfacing telephone circuit connected to the line could perform a soft reversal of the supply polarity to the line.

However, interface telephone circuits have been implemented heretofore by integrated circuits which tend to be complicated both in construction and operation, and to which new functions cannot be integrated in a simple manner without compromising in some other areas of the circuit. In the specific instance considered, the reversal of polarity to the line, i.e. exchanging the TIP and RING wires, may cause a malfunction instead of fostering the suppression of line noise. Thus, no monolithically integrated telephone circuits are known at present which can reverse the supply polarity to the subscriber line in a soft manner.

An underlying technical problem of this invention is to provide an interfacing telephone circuit which is monolithically integrated and adapted to drive a telephone subscriber line, having further such structural and functional features as to allow a soft reversal of the line polarity, thereby overcoming the limitations of prior art approaches.

SUMMARY OF THE INVENTION

This problem is solved by an interface integrated circuit for driving a telephone subscriber line, being of a type which includes a line current sensor and a phase converter, both associated with an output stage connected to the line. The circuit includes a comparator connected between the phase converter and the output stage; a control and monitoring circuit means linked operatively to the output of the comparator; and a plurality of switches associated with the input side of the phase converter, as well as with the current sensor and the output stage. The switches are linked operatively to respective outputs of the circuit means to reverse polarity of the line supply upon a predetermined threshold value for the comparator being exceeded.

In one embodiment, the comparator has respective inputs connected to signal outputs of the converter.

An external capacitor is connected between a reference potential and a voltage input of the converter, and a switch is connected between the input and a pair of phase-opposed current sources independently connected between the switch and the reference potential.

The output stage includes a pair of output buffers, one for each line terminal, and the switches are connected between the signal outputs and corresponding inputs of the buffers.

The control and monitoring circuit means is a logic circuit having a first input connected to the comparator output and a second input adapted to receive an enable signal from an exchange incorporating the telephone circuit. The logic circuit has respective control outputs for each of the electronic switches.

The features and advantages of a circuit according to the invention will become apparent from the following detailed description of an embodiment thereof, given by way of example and not of limitation with reference to the accompanying drawings.

DETAILED DESCRIPTION

Figure 1:
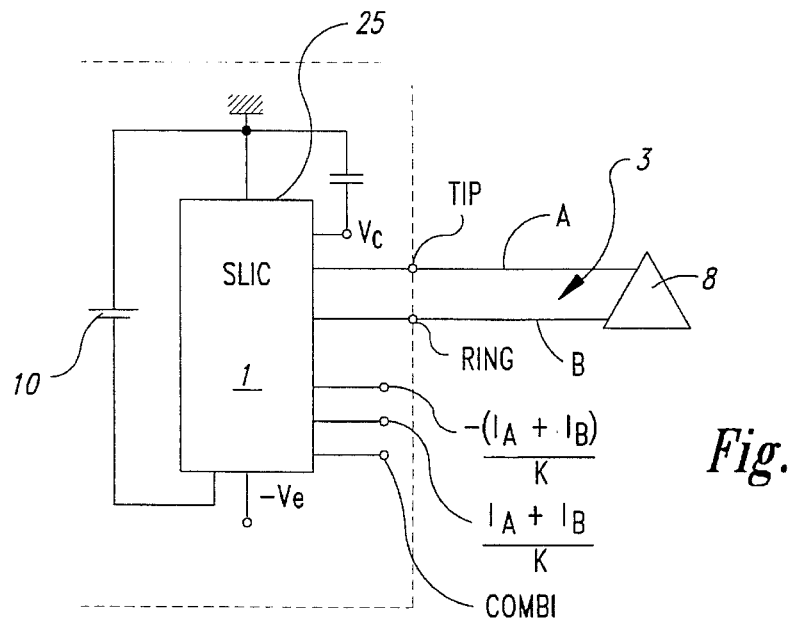
FIG. 1 is a diagram showing schematically a monolithically integrated interface telephone circuit connected to a telephone subscriber line.

With reference to the drawing views, generally and schematically shown is a line driver circuit 1 included in a monolithically integrated telephone circuit 25 called SLIC (Subscriber Line Interface Circuit) for installation in telephone exchanges.

The line driver circuit 1 is powered by a voltage −Ve and connected to a two-wire telephone line 3 which is connected to a subscriber apparatus 8 and comprises a pair of conductors A and B. The voltage Ve is a voltage produced as described in U.S. Pat. No. 4,800,589 to Siglioni, et al., where Ve corresponds to the supply voltage $V_B$ of U.S. Pat. No.

4,800,589. The line driver circuit 1 drives the telephone line 3 through a pair of outputs, namely: a first terminal TIP connected to the conductor A, and a second terminal RING connected to the conductor B. Respective line currents $I_A$ and $I_B$ are supplied at the terminals TIP and RING.

Advantageously, according to the invention, the circuit 1 is equipped with a protection device effective to perform a soft reversal of the supply polarity of the line 3 wires, and this without generating spurious signals or interferences in the audio transmission bands. For this purpose, the circuit 1 is constructed with different circuit portions, each exhibiting predetermined functional characteristics as detailed herein below.

Figure 2:
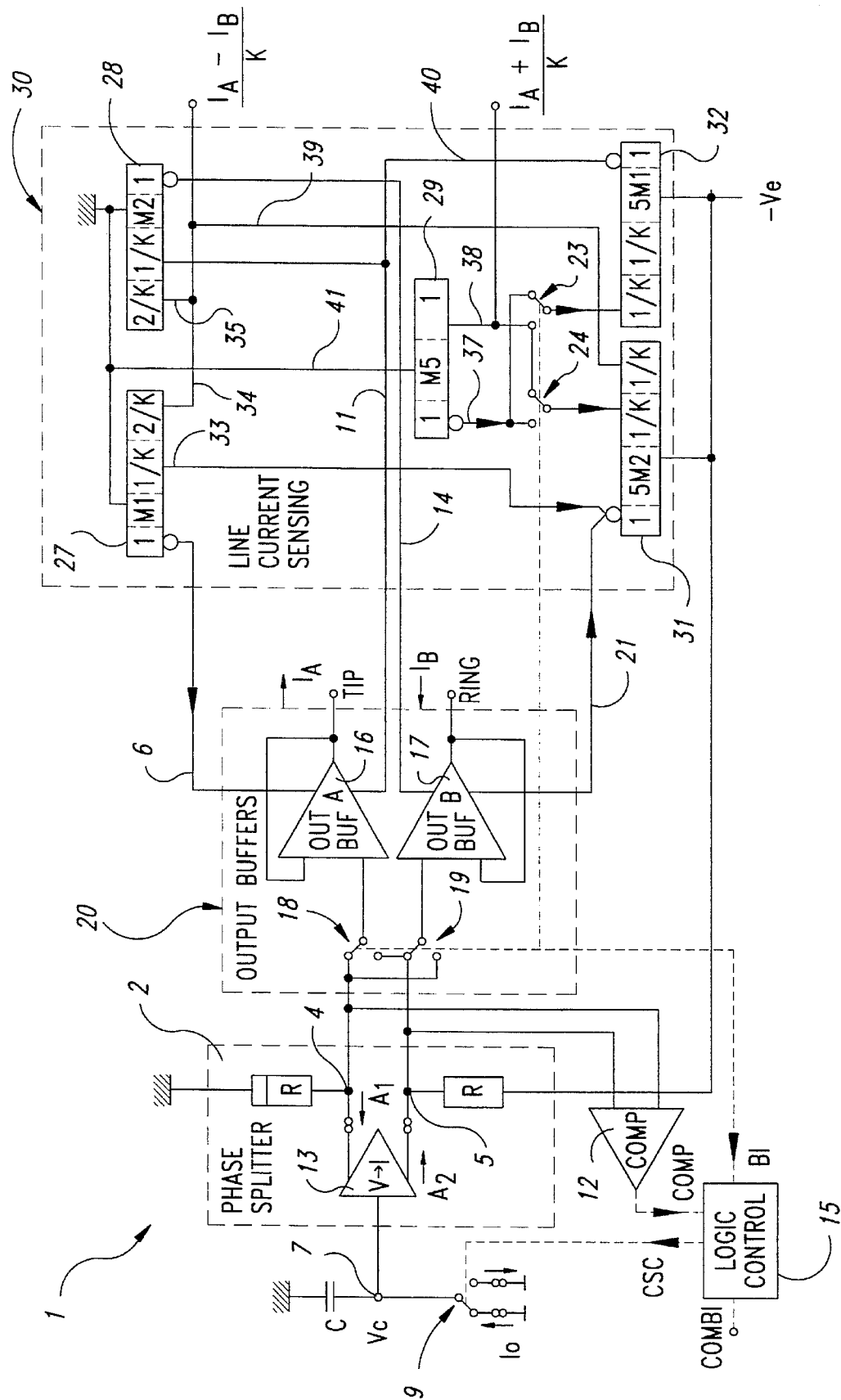
FIG. 2 is a diagram showing schematically an interface circuit according to this invention and effective to permit reversal of the supply polarity to the telephone line.

With reference to FIG. 2, a first circuit portion 2 comprises a voltage-current converter 13 having a voltage input 7 and a pair of signal outputs 4, 5. Correspondingly associated with each of said outputs 4, 5 is a current source A1, A2. Such voltage-current converters and current sources are known in the art.

The first signal output 4 is connected to ground, downstream from the current source A1, via a resistor R1. The second signal output 5 is connected to a supply pole at a negative voltage −Ve via a resistor R2. Preferably, the resistors R1 and R2 have the same value, whilst the current supplied from the current source A1 is equal to the negative of the current supplied by the current source A2.

The signal outputs 4 and 5 are also connected to respective inputs of a comparator 12. The single output COMP from the comparator 12 is applied to an input of a logic circuit 15.

The voltage input 7 of the converter 2 is AC coupled, on the one side, to ground via a capacitor C, and on the other side, to a switch 9. Advantageously, the capacitor C is the only external component part of the integrated circuit 1. The switch 9 is, of course, an electronic switch as is known, and can be switched between a first position, where it connects the input 7 to one end of a first current source $I_{o1}$ having the opposite end grounded, and a second position where it connects the input 7 to one end of a second current source $I_{o2}$ having the opposite end grounded. The current sources $I_{o1}$, $I_{o2}$ associated with the switch 9 are in phase opposition with each other. The switch 9 is linked operatively to an output CSC from the logic circuit 15, which circuit receives a control enable signal at a second input COMBI.

A second circuit portion 20 comprises an output stage which incorporates a pair of output buffers 16, 17, one for each of the TIP and RING line terminals. Each output buffer 16 and 17 has its output fed back to one of its buffer inputs. The other input of each buffer is connected to a corresponding switch 18, 19. Each switch 18, 19 is an electronic type and has two stable states, each associated with the respective signal output 4, 5 of the converter 13. The switches 18 and 19 are linked operatively to a second output BI of the logic circuit 15.

A third circuit portion 30 comprises a line current sensor connected between the supply pole at the negative voltage −Ve and ground. Such signals are correlated by an appropriate sign with the line currents $I_A$ and $I_B$. The third circuit portion 30 processes such current signals IA and $I_B$ to output further signals which are respectively proportional to the difference and the sum of the line currents, i.e., $(I_A-I_B)/K$ and $(I_A+I_B)/K$, where K is a constant of proportionality.

The third circuit portion 30 includes plural current mirrors 27 having suitable gain values to output said signals proportional to the difference and the sum of the line currents. A description of the construction and operation of such circuits, excluding electronic switches 23, 24 which provide isolation for downstream circuits, is presented in U.S. Pat. No. 4,782,507 to Siglioni et al.

The third circuit portion 30 is also provided with the pair of electronic switches 23 and 24 linked operatively to the output BI of the logic circuit 15. The switches 23, 24 connect to lines 37, 38 when the signal BI is low and connect to lines 38, 37 when the signal BI is high.

Figure 3:
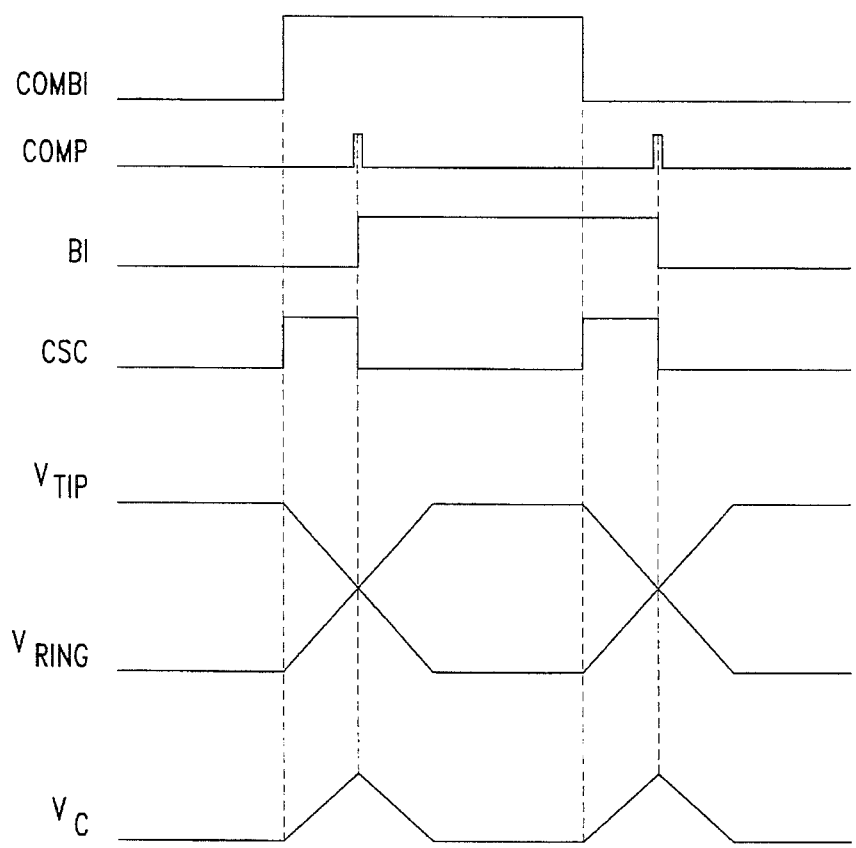
FIG. 3 shows a set of graphs plotted along a common time base and related to voltage signals appearing in the circuit of FIG. 2.

The operation of the inventive circuit will now be explained. The battery reversal command, as shown in the first line of FIG. 3, is supplied to the input COMBI of the line driver circuit 1 from exchange equipment. This command is then passed by the logic circuit 15 as its own output CSC to enable, by appropriately controlling operation of the switch 9, the capacitor C to become charged with a constant current from one of the current sources $I_{o1}$, $I_{o2}$.

As a result of the charging of the capacitor C, a ramp voltage Vc is generated which will, through the voltage input 7 of the voltage-current converter 13, be amplified and converted to two signals in phase opposition within the circuit portion 2. The two phase-opposed signals are transmitted to the line buffers 16, 17, respectively, through the outputs 4 and 5 of the circuit portion 2.

The comparator 12, being in turn connected to the outputs 4 and 5, will detect the zero value of the line voltage between the outputs 4 and 5. The comparator 12 will, in response, transmit, to the logic circuit 15, a signal which activates the command to switch for the input stages of the buffers 16 and 17.

The output BI from the logic circuit 15, in fact, operates the switches 18 and 19, and in parallel therewith, the switches 23 and 24 in the line current sensor 30.

Simultaneously therewith, the output CSC will also change over and operate the switch 9 as well, thereby reversing the direction of the current through the capacitor C and causing the capacitor C to be discharged. The voltage Vc in the capacitor will consequently ramp back down, as shown in the lower portion of FIG. 3.

The line conductors A, B are then supplied once again the original current, and through the resistors R will be driven to their original voltages proportional to Vc, but with the line polarities reversed, as shown in FIG. 3 with respect to the patterns of the signals VTIP and VRING. Thus, the magnitude of the signal VRING will continue to increase as the capacitor voltage Vc ramps back down, and the signal VTIP will continue to decrease. As is known, the voltages at the output of the buffers 16, 17 will be identical to the voltages at their inputs so that the curves for VTIP and VRING in FIG. 3 also represent the voltages at the terminals TIP and RING.

One skilled in the art will recognize that the above operations are repeated upon the battery reversal signal being presented to the input COMBI by the exchange equipment being switched back to the original condition.

In essence, the circuit of this invention utilizes the suppression of the line voltage to switch over the various stages, thereby avoiding discontinuities in the line voltage and current. By virtue of the polarity recovery at the sensor 30, the operations connected with the battery reversal can be confined to the first, second and third circuit portions 2, 20 and 30. But the integrated telephone interface circuit 25 comprises more circuit portions, not shown because conventional, which may be arranged to handle the voice signal, for example.

Consider, for example, that circuit portion which provides the telephone hybrid coil, or that handling the DC supply to the telephone line. These additional circuit portions are in no way affected by the operations described above in connection with the battery reversal. It follows that these additional circuit portions may be made even simpler by omitting the stages for phase reversal or rectifying circuits which would be required in the absence of the above described interface circuit 25. Where such portions are separate from the interface circuit 25, they would not even require the handling feature associated with battery reversal.

The circuit of this invention does solve the technical problem described above, and affords a number of advantages, such as improved communications quality can be ensured over lines utilizing the battery reversal function. Furthermore, the inventive circuit drastically cuts down interferences (bit rate error) with data communications. Another important advantage is that the invention is compatible to those communications systems which employ unbalanced powering of the telephone line.

Notice, moreover, that the capacitor C is an external component part of the circuit 1, and that its value may be decided upon by a user in designing the telephone exchange. Accordingly, the user will be able to also select the rate at which the circuit is to reverse the line polarity, the charge/discharge current for the capacitor C being, in fact, a predetermined constant value.

The circuit of this invention is not only effective to produce a soft reversal of the line polarity but also allows the rate of such a reversal to be programmed to suit individual design requirements. Understandably, many changes and modifications may be made unto the circuit of this invention within the scope of the appended claims.

I claim:

1. An interface circuit for a telephone subscriber line, comprising:
    an input voltage generator having a control terminal, the input voltage generator being responsive to generate an input signal in response to a control signal at said control terminal;
    a voltage-to-current converter connected to receive the input signal from the input voltage generator, the voltage-to-current converter having a first output terminal for supplying a first output current through a first circuit element and a second output terminal for supplying a second output current through a second circuit element wherein the first output current and the second output current are inversely proportional;
    a voltage comparator couplable between the first and second output terminals, and producing a comparator output signal;
    an electronic logic controller having a first input terminal for receiving the comparator output signal and a second input terminal for receiving a polarity reversal signal, the logic controller generating the control signal for input to the control terminal of the input voltage generator in response to the polarity reversal signal and the comparator output signal, the logic controller being operative to generate a buffer control signal in response to the comparator output signal;
    a first buffer coupled to the first output terminal;
    a second buffer coupled to the second output terminal; and
    a pair of electronically actuatable switches, each connected between a respective one of the first and second output terminals of the voltage-to-current converter and a respective one of the output buffers, the switches being actuatable by the buffer control signal.

2. The interface circuit of claim 1 wherein the input voltage generator is a ramp voltage generator.

3. The interface circuit of claim 1, further comprising a single external electrical element coupled to control the rate of reversal of polarity upon the polarity reversal signal.

4. The interface circuit of claim 3 wherein the single external electrical element is a capacitor.

5. The interface circuit of claim 1, further comprising:
    a line current sensor for monitoring current flowing through each of the line terminals, the line current sensor including a pair of output terminals, the line current sensor providing at its first output terminal a current proportional to the sum of the currents through the line terminals and providing at its second output terminal a current proportional to the difference between the currents through each of the line terminals.

6. The interface circuit of claim 5 wherein the line current sensor comprises a first plurality of current mirrors receiving said first output current, each current mirror generating a mirror current proportional to the first output current and a second plurality of current mirrors receiving said second output current, each current mirror generating a mirror current proportional to said second output current.

7. An integrated interface circuit comprising:
    a ramp generator having an output terminal and a control terminal, the ramp generator producing a ramp signal in response to a control signal at the control terminal;
    a converter having an input terminal and a pair of output terminals, the converter producing at a first of the output terminals an upwardly ramping voltage in response to a first upwardly ramping portion of the ramp signal and a downwardly ramping signal during a second downwardly ramping portion of the ramp signal, the converter also producing at a second of the output terminals, a downwardly ramping signal referenced to a supply voltage during the first portion of the ramp signal and an upwardly ramping signal referenced to the supply voltage during the second portion of the ramp signal;
    a comparator connected to receive the signals from the first and second output terminals of the converter and producing an output signal indicative of the relative values of the signals from the converter;
    a first switch having an output terminal and a pair of input terminals, the first switch connected to receive the signals from the converter at the input terminal, the first switch in a first position transmitting the signal from the first output terminal of the converter to the output terminal of the first switch, and in a second position transmitting the signal from the second output terminal of the converter to the output terminal of the first switch;
    a second switch having an output terminal and a pair of input terminals, the second switch connected to receive the signals from the converter at the input terminal, the second switch in a first position transmitting the signal from the second output terminal of the converter to the output terminal of the second switch, and in a second position transmitting the signal from the first output terminal of the converter to the output terminal of the second switch; and
    a logic controller connected to receive the signal indicative of the relative voltages of the signals from the converter and to cause each of the first and second switches to change from their respective first positions to their respective second positions when the voltage signals from the converter are equal.

8. The circuit of claim 7 further comprising:

a first output buffer connected between the output terminal of the first switch and a tip terminal of a telephone line, and a second output buffer connected between the output terminal of the second switch and a ring terminal of a telephone line.

9. The circuit of claim 8 further comprising a current sensor having two output terminals, the current sensor connected to sense the currents through the tip terminal and the ring terminal, the current sensor producing at a first of the output terminals, a current proportional to the sum of the currents through the tip and ring terminals and producing at a second of the output terminals a current proportional to the difference between current through the tip and ring terminals.

* * * * *